(12) United States Patent
Clementson, III

(10) Patent No.: US 9,739,650 B2
(45) Date of Patent: Aug. 22, 2017

(54) AUTOMATIC ANALOG SELECTION CIRCUIT FOR READING EXTERNAL SENSORS

(71) Applicant: Hale Products, Inc., Collegeville, PA (US)

(72) Inventor: George H. Clementson, III, Summerfield, FL (US)

(73) Assignee: HALE PRODUCTS, INC., Collegeville, PA (US)

( * ) Notice: Subject to any disclaimer, the term of this patent is extended or adjusted under 35 U.S.C. 154(b) by 0 days.

(21) Appl. No.: 14/934,777

(22) Filed: Nov. 6, 2015

(65) Prior Publication Data

US 2016/0134294 A1 May 12, 2016

Related U.S. Application Data

(60) Provisional application No. 62/076,102, filed on Nov. 6, 2014.

(51) Int. Cl.
| | | |
|---|---|---|
| *H03M 1/12* | (2006.01) | |
| *G01D 21/00* | (2006.01) | |
| *G08C 13/00* | (2006.01) | |
| *H04Q 9/00* | (2006.01) | |
| *G06F 17/40* | (2006.01) | |

(52) U.S. Cl.
CPC ............. *G01D 21/00* (2013.01); *G08C 13/00* (2013.01); *H04Q 9/00* (2013.01); *G06F 17/40* (2013.01)

(58) Field of Classification Search
CPC ...... H03M 1/0604; H03M 1/12; G01D 21/00; G08C 13/00; H04Q 9/00; G06F 17/40
USPC .................................................. 341/141, 155
See application file for complete search history.

(56) References Cited

U.S. PATENT DOCUMENTS

| | | | | |
|---|---|---|---|---|
| 4,423,408 A * | 12/1983 | Place | .................. | H03M 1/1205 324/99 D |
| 7,411,533 B2 * | 8/2008 | Posamentier | ....... | H03M 1/1225 341/122 |
| 7,436,290 B2 * | 10/2008 | Williams | ............... | G01D 21/00 340/438 |
| 8,050,881 B1 * | 11/2011 | Yeung | .................. | A61B 5/0024 370/503 |
| 8,924,600 B2 * | 12/2014 | Alley | ................. | G05B 19/0423 710/12 |

* cited by examiner

*Primary Examiner* — Khai M Nguyen
(74) *Attorney, Agent, or Firm* — Panitch Schwarze Belisario & Nadel LLP

(57) ABSTRACT

A system configured to convert an output of a sensor for an application includes an analog input circuit and a processor. The analog input circuit is configured to receive the sensor output. The processor is configured to determine an analog input of the analog input circuit to read the sensor output, and based on one or more received sensor characteristics, and convert the read sensor output to a signal compatible with the application.

18 Claims, 4 Drawing Sheets

AUTOMATIC ANALOG SELECTION CIRCUIT FOR READING EXTERNAL SENSORS

CROSS-REFERENCE TO RELATED APPLICATIONS

This application claims the benefit of U.S. Provisional Patent Application No. 62/076,102, filed on Nov. 11, 2014, entitled "Automatic Analog Selection Circuit For Reading External Sensors," the entire contents of which are incorporated herein by reference in their entirety.

BACKGROUND OF THE INVENTION

The present invention relates generally to external sensors, and, more particularly, to an automatic analog selection circuit for facilitating the reading of external sensors having differing outputs.

Sensors are used to detect and/or monitor a variety of parameters, such as, but not limited to, vibration, acceleration, temperature, humidity, acidity, turbidity, the presence and/or concentration of one or more chemicals or gasses, flow, altitude, geographic location, direction or heading, thickness, corrosion rate, color, level, angular velocity, speed, pressure, pulse rate, or any other desired parameter. The sensor converts such a detected and/or monitored parameter into a proportional electrical signal which may be used for a variety of applications. As an example application, the electrical signal may be supplied to a controller in communication with one or more valves to, for example, control fluid flow of a system.

Because most applications use input types which often differ from sensor outputs, additional hardware is typically used to convert the raw sensor electrical output to a signal compatible with the input of the desired application. For example, a pressure transmitter translates low-level analog electrical outputs from a pressure sensor to higher-level electrical signals that are suitable for transmission and processing. The hardware employed depends on the type of raw sensor output. For example, a sensor outputting an electrical signal of 4-20 milliamps (mA) may employ the use of one particular circuit for conversion, while a sensor outputting an electrical signal of 0-5 volts (V) may employ the use of another separate conversion circuit. Consequently, separate hardware circuitry would need to be employed in order to use different sensor types, which can be time consuming, inefficient, and costly.

Accordingly, there is a need for a system that receives various inputs in a single circuit, and, based on the type of sensor used, automatically selects an appropriate analog input to convert the sensor's output signal to a compatible signal for the desired application.

BRIEF SUMMARY OF THE INVENTION

Briefly stated, the present invention is directed to a system configured to convert an output of a sensor for an application. The system includes an analog input circuit and a processor. The analog input circuit is configured to receive the sensor output. The processor is configured to determine an analog input of the analog input circuit to read the sensor output, and based on one or more received sensor characteristics, convert the read sensor output to a signal compatible with the application.

In another embodiment, the present invention comprises a method for automatically converting, by an analog selection circuit, a sensor output of a sensor of an application. The method comprises receiving one or more sensor characteristics of the sensor; based on the one or more received sensor characteristics, determining an analog input of an analog input circuit of the analog selection circuit, to read the sensor output; and converting the read sensor output to a signal compatible with the application.

BRIEF DESCRIPTION OF THE SEVERAL VIEWS OF THE DRAWINGS

The foregoing summaries as well as the following detailed description of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
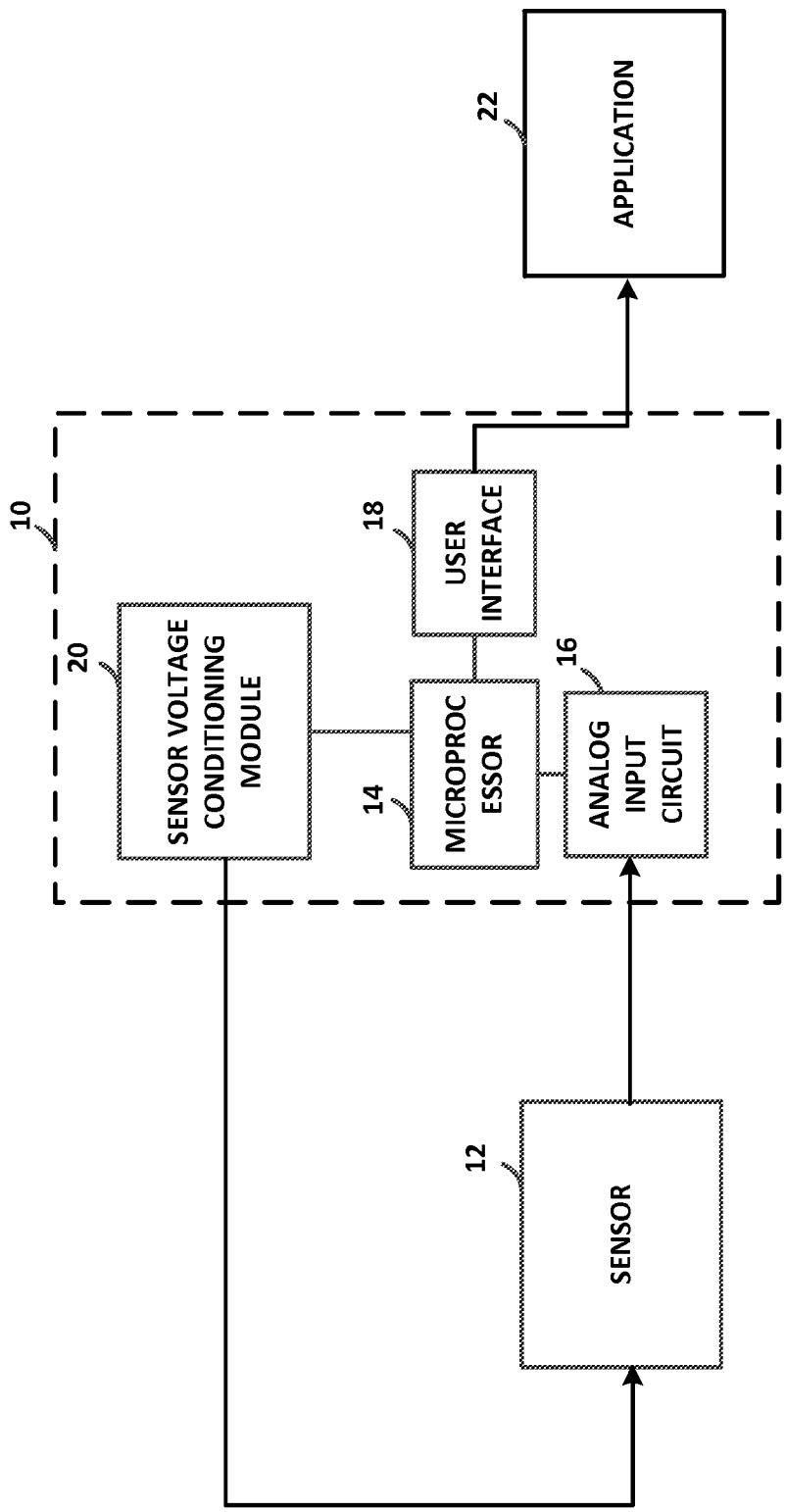
FIG. 1 is a schematic block diagram of an automatic analog selection system according to an embodiment of the present invention.

Certain terminology is used in the following description for convenience only and is not limiting. The words "lower," "bottom," "upper" and "top" designate directions in the drawings to which reference is made. Unless specifically set forth herein, the terms "a," "an" and "the" are not limited to one element, but instead should be read as meaning "at least one." The terminology includes the words noted above, derivatives thereof and words of similar import. It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Disclosed embodiments of the present invention are directed to a system that includes various analog inputs, and, based on the input sensor, automatically selects an appropriate analog input for reading the input sensor for the desired application. For example, the system includes a circuit that allows sensors, having differing types of sensors and sensor outputs (e.g., resistive, digital, 4-20 mA, 0-5V, 0-30V, digital flow, and the like) to be plugged into a single port, read, and translated for use by various applications, without modification of the circuitry of the system. The translated compatible output may be in the form of a higher or lower (than the raw sensor output) range analog voltage, higher or lower current, resistance, and the like.

Thus, as illustrated in FIG. 1, an analog input selection system 10 automatically selects a compatible analog input for reading an output of a sensor 12. As shown, the system includes a microprocessor 14, an analog input circuit 16, a user interface 18, and a sensor voltage conditioning module 20.

Based on the type of sensor output, the microprocessor 14 turns on one or more of the MOSFETS 24, 26, 28, 30, and 32. For example, if the sensor output is the form of 4-20 mA, the microprocessor 14 turns on the MOSFET 24, by, for example, applying a threshold voltage to the gate of the MOSFET 24. Alternatively, if the sensor output is in the form of 0-5 V, the microprocessor 14 turns on MOSFET 26, by, for example, applying a threshold voltage to the gate of the MOSFET 26. The below chart is a list of which MOSFET(s) are switched on or off depending on the selected analog input.

| Selected Input | Resistive MOSFET (24) | Digital MOSFET (26) | 4-20 mA MOSFET (28) | 0-5 Volt MOSFET (30) | 0-30 Volt MOSFET (32) |
|---|---|---|---|---|---|
| Resistive | ON | OFF | OFF | OFF | OFF |
| Digital | OFF | ON | OFF | OFF | OFF |
| 4-20 mA | OFF | OFF | ON | OFF | OFF |
| 0-5 Volt | OFF | OFF | OFF | ON | OFF |
| 0-30 Volt | OFF | ON | OFF | OFF | ON |
| Digital Flow | OFF | OFF | OFF | OFF | OFF |

Using the user interface 18, a user enters (or selects) a signal output type of the sensor 12 to be read by the system 10. Based on such user input, the microprocessor 14 automatically selects a suitable analog input to read the signal output of the sensor 12. The microprocessor 14 also uses such user input to select an appropriate voltage level to power the sensor 12. As such, the system 10 may also include the sensor voltage conditioning module 20 to ensure the voltage supplied to the sensor 12 remains in an acceptable range, so as to operate properly for any desired application 22.

Figure 2:
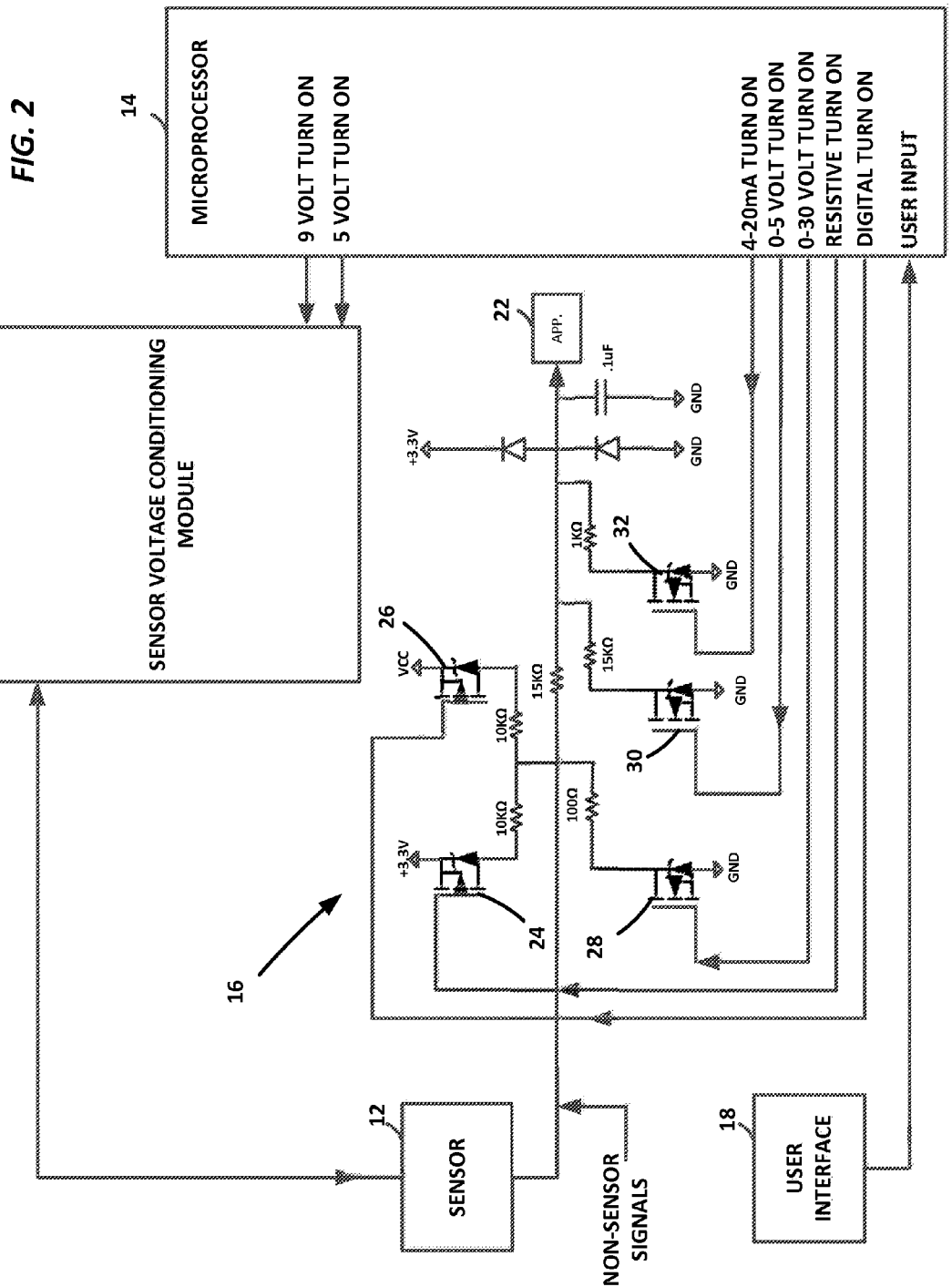
FIG. 2 is a detailed schematic diagram showing components of the analog circuit connected to a microprocessor of the automatic analog selection system according to an embodiment of the present invention.

FIG. 2 is a detailed schematic diagram of the analog input selection circuit 16 coupled to the sensor 12 and the microprocessor 14 according to an embodiment of the present invention. The analog input selection circuit 16 includes a plurality of metal oxide semiconductor field-effect transistors (MOSFETs) 24, 26, 28, 30, and 32, in electrical communication with the microprocessor 14. More specifically, the analog input selection circuit 16 includes two p-channel MOSFETs 24 and 26, and three n-channel MOSFETs 28, 30, and 32. As shown, a particular amount of resistance is connected in series with each MOSFET 24, 26, 28, 30, and 32. For example, MOSFETs 24 and 26 are connected in series with 10 KΩ resistors respectively, the MOSFET 28 is connected in series with a 100Ω resistor, the MOSFET 30 is connected in series with a 15 KΩ resistor, and the MOSFET 32 is connected in series with a 1 KΩ resistor. Consequently, the amount of resistance encountered by the sensor output depends on which MOSFET(s) are currently turned on.

The MOSFET(s) are activated (i.e., turned on) by the microprocessor 14 via a plurality of outputs coupled to the gates of the respective MOSFETS 24, 26, 28, 30, and 32. The microprocessor 14 has an additional two outputs coupled to the sensor voltage conditioning module 20, described in more detail below in connection with FIG. 3. The circuit 16 also may include a pair of diodes and a bypass capacitor to improve, signal integrity, transient response, and noise rejection. Even though, as shown, the analog input selection circuit 16 includes five MOSFETs, any number of MOSFETs (p-channel or n-channel) may be included in still keeping with the invention. Further, other amounts of resistance may be included in the circuit 16 in still keeping with the invention.

Figure 3:
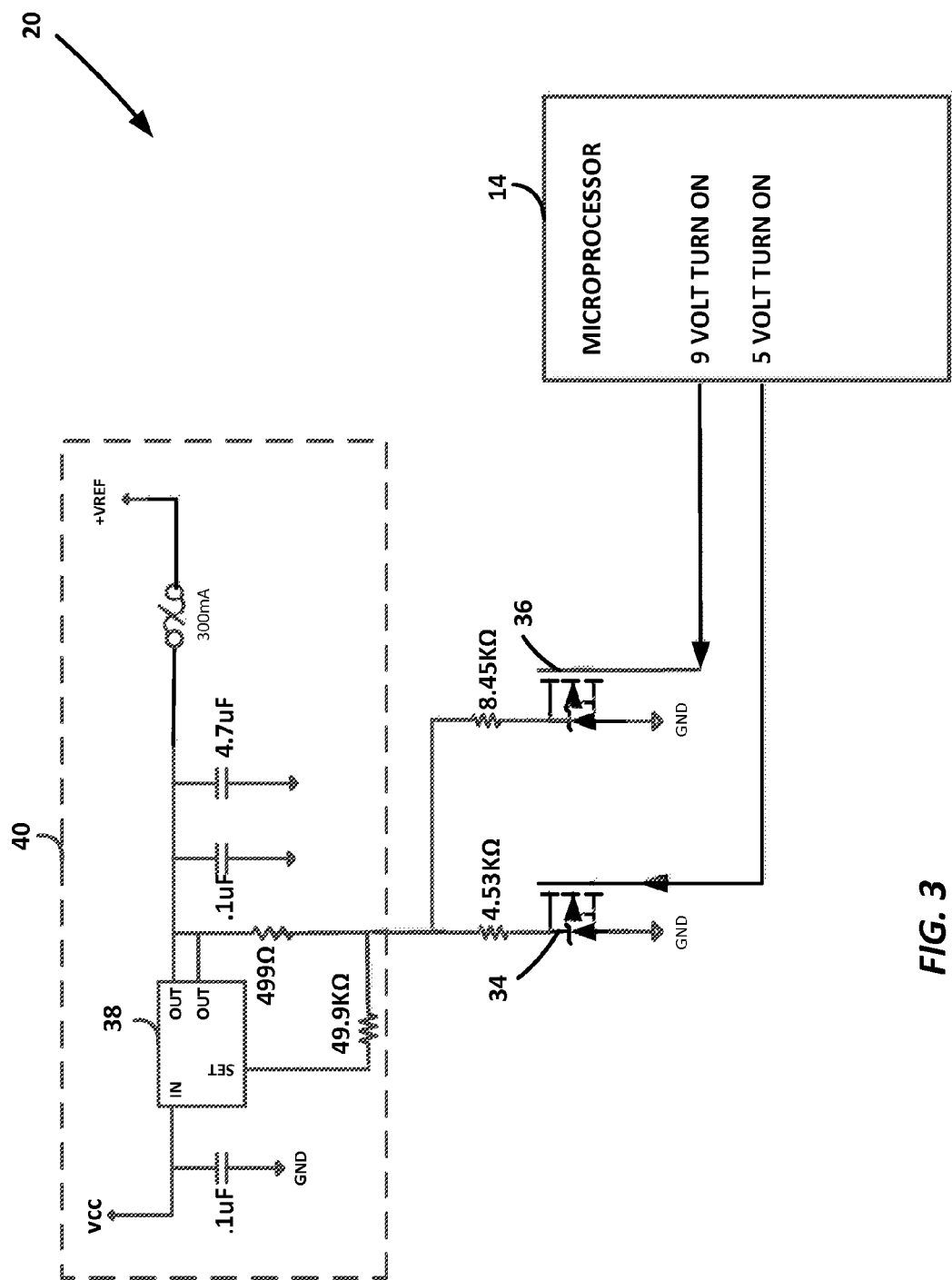
FIG. 3 is a detailed schematic diagram showing components of the sensor voltage conditioning module connected to the microprocessor of FIG. 2, in accordance with a preferred embodiment of the present invention.

Because certain operational characteristics are unique to a type of sensor (which may include a host microcontroller (not shown) including an analog to digital (A/D) converter (also not shown)), components of the sensor voltage conditioning module 20 are selected based on each such type of sensor 12. For example, if the host microcontroller of the sensor 12 operates at 3.3 V and has an external reference of 2.5 V for an associated analog to digital (A/D) converter, resistors may need to be selected based on a minimum impedance of the sensor 12 and maximum resolution of the A/D converter, so that when a maximum voltage or current is applied, the proper voltage to the host microcontroller does not exceed the reference voltage of the A/D converter. Thus, as illustrated in FIG. 3, the system includes the sensor voltage conditioning module 20. The sensor voltage conditioning module 20 includes a pair of MOSFETS 34 and 36 in series with a 4.53 KΩ resistor and an 8.45 KΩ resistor respectively, which are coupled to an input of a selectable voltage regulator 40.

Accordingly, based on the sensor voltage needed, the microprocessor 14 turns on the appropriate MOSFET, which, in turn, determines the amount of resistance seen by the signal. Typically, a 0-5 V input uses a 5 V reference for the sensor, while a 4-20 mA input typically uses a 9 V output reference. Therefore, for example, if the 4-20 mA signal is selected, the microprocessor turns on the 9 V output and turns off the 5 V Output. Alternatively, if a 0-5 V signal is selected, the microprocessor turns on the 5 V output and turns off the 9 V output.

Referring now more particularly to the voltage regulator integrated circuit (IC) 38, a VCC power supply is filtered by a 0.1 uF capacitor before being supplied to an IC voltage regulator IC 38, which may be of a type LT3080 offered by Linear Technology Inc. of Milpitas, Calif. However, it should be noted that any type of voltage regulator IC may be used in still keeping with the invention. The selectable voltage regulator 40 is connected with a 49.9 KΩ resistor and a 499Ω resistor. Another 0.1 uF capacitor and a 4.7 uF capacitor may provide filtering for the regulated reference voltage output from the selectable voltage regulator 40, and supplied to the sensor 12. It should be noted that the above discussed circuits and modules may include other circuitry operatively coupled to the microcontroller 14 to assist the microcontroller 14 in performing the functions discussed herein.

Figure 4:
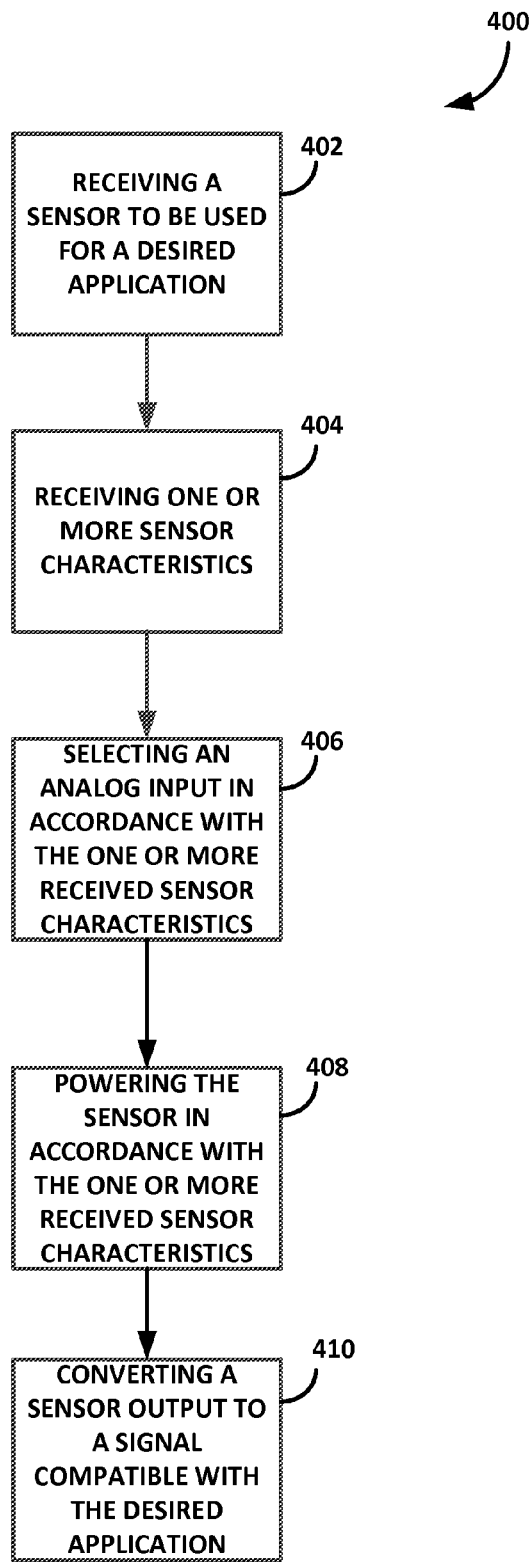
FIG. 4 is a flow diagram of one embodiment of a method for automatically selecting an analog input, according to an embodiment of the present invention.

FIG. 4 is a flow diagram of one embodiment of a method 400 for automatically selecting an analog input for use with a sensor 12. The method may comprise a number of steps which may be performed in any suitable order. Step 402 comprises receiving, by the system, a sensor 12 to be used for any desired application. Step 404 comprises receiving one or more sensor characteristics (e.g., sensor type, sensor output type, etc.). Step 406 comprises selecting an analog input to read the sensor 12 in accordance with such one or more received sensor characteristics. Step 408 comprises powering the sensor in accordance with such one or more received sensor characteristics. With the circuit now configured, Step 410 comprises converting a sensor output to a signal compatible with a desired application.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the disclosure as set forth in the appended claims.

I claim:

1. A system configured to convert an output of a sensor for an application, the system comprising:
an analog input circuit having a single port and a plurality of analog inputs, the port being configured to receive the sensor output and being selectively connectable to each of the plurality of analog inputs;
a user interface configured to receive input from a user; and
a processor configured to:
select one of the analog inputs of the analog input circuit to connect to the single port to read the sensor output based on one or more sensor characteristics received by the system through the user interface; and
convert the read sensor output to a signal compatible with the application.

2. The system of claim 1, wherein the processor is further configured to automatically select the analog input of the analog input circuit to read the sensor output, based on the one or more sensor characteristics received through the user interface.

3. The system of claim 1, wherein the processor is further configured to determine, based on the one or more sensor characteristics received through the user interface, a voltage level for powering the sensor.

4. The system of claim 3, further comprising:
a sensor voltage conditioning module configured to regulate the voltage level.

5. The system of claim 1, wherein the one or more sensor characteristics received through the user interface include a sensor type, a sensor output type, or both a sensor type and a sensor output type.

6. The system of claim 1, wherein the processor is further configured to activate, based on the one or more sensor characteristics received through the user interface, one or more of a plurality of transistors of the analog input circuit.

7. The system of claim 1, wherein the single port is compatible with a first sensor and a second sensor, the first sensor being different than the second sensor.

8. A system configured to convert an output of a sensor for an application, the system comprising:
an analog input circuit having a single port and a plurality of analog inputs, the single port being compatible with a first sensor and a second sensor, the first sensor being different from the second sensor, the single port being selectively connectable to each of the plurality of analog inputs;
a user interface configured to receive input from a user; and
a processor configured to:
automatically select one of the analog inputs of the analog input circuit to read the sensor output, based on one or more sensor characteristics received through the user interface regarding the one of the first or second sensor that is connected to the single port; and
convert the read sensor output to a signal compatible with the application.

9. The system of claim 8, wherein the processor is further configured to determine, based on the one or more sensor characteristics received through the user interface, a voltage level for powering the sensor.

10. The system of claim 9, further comprising:
a sensor voltage conditioning module configured to regulate the voltage level.

11. The system of claim 8, wherein the one or more sensor characteristics include a sensor type, a sensor output type, or both a sensor type and a sensor output type.

12. The system of claim 8, wherein the processor is further configured to activate one or more of a plurality of transistors of the analog input circuit based on the one or more sensor characteristics received through the user interface one or more.

13. A method for automatically adapting, by an analog selection circuit a sensor output of a sensor for an application, the method comprising:
receiving, through a user interface configured to receive input from a user, one or more sensor characteristics of the sensor connected to a single port of an analog input circuit of the analog selection circuit;
based on the one or more sensor characteristics received through the user interface, selecting one of a plurality of analog inputs of the analog input circuit to connect to the single port to read the sensor output; and
converting the read sensor output to a signal compatible with the application.

14. The method of claim 13, further comprising:
based on the one or more sensor characteristics received through the user interface, determining a voltage level for powering the sensor.

15. The method of claim 14, further comprising:
regulating the voltage level.

16. The method of claim 13, wherein the one or more sensor characteristics received through the user interface include a sensor type, a sensor output type, or both a sensor type and a sensor output type.

17. The method of claim 13, wherein the single port is compatible with a first sensor and a second sensor, the first sensor being different than the second sensor.

18. The method of claim 13, further comprising activating one or more of a plurality of transistors of the analog input circuit based on the one or more sensor characteristics received through the user interface.

* * * * *